United States Patent
Chen

(10) Patent No.: US 12,149,802 B2
(45) Date of Patent: Nov. 19, 2024

(54) REAL-WORLD VIEW DISPLAY METHOD, VIDEO PASS-THROUGH SYSTEM AND NON-TRANSITORY COMPUTER READABLE STORAGE MEDIUM

(71) Applicant: HTC Corporation, Taoyuan (TW)

(72) Inventor: Wei-Fan Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 105 days.

(21) Appl. No.: 18/150,207

(22) Filed: Jan. 5, 2023

(65) Prior Publication Data

US 2023/0291982 A1    Sep. 14, 2023

Related U.S. Application Data

(60) Provisional application No. 63/269,265, filed on Mar. 14, 2022.

(51) Int. Cl.
*H04N 23/45* (2023.01)
*H04N 13/25* (2018.01)
*H04N 13/356* (2018.01)
*H04N 13/361* (2018.01)
*H04N 23/84* (2023.01)

(52) U.S. Cl.
CPC ............ *H04N 23/45* (2023.01); *H04N 13/25* (2018.05); *H04N 13/356* (2018.05); *H04N 13/361* (2018.05); *H04N 23/84* (2023.01)

(58) Field of Classification Search
CPC ........ H04N 23/45; H04N 23/84; H04N 13/25; H04N 13/356; H04N 13/361
See application file for complete search history.

(56) References Cited

U.S. PATENT DOCUMENTS

| | | | | |
|---|---|---|---|---|
| 6,597,807 B1* | 7/2003 | Watkins | .................... | G06T 5/50 |
| | | | | 382/164 |
| 11,210,860 B2* | 12/2021 | Noris | ........................ | G06T 7/50 |
| 11,451,758 B1* | 9/2022 | Chaurasia | ............ | H04N 13/344 |
| 2014/0085502 A1* | 3/2014 | Lin | ........................ | H04N 25/71 |
| | | | | 348/223.1 |
| 2015/0104114 A1* | 4/2015 | Bai | ........................ | G06F 16/51 |
| | | | | 382/284 |
| 2016/0125644 A1 | 5/2016 | James et al. | | |
| 2016/0260260 A1* | 9/2016 | Fei | ........................... | H04N 5/33 |

(Continued)

OTHER PUBLICATIONS

The office action of the corresponding Taiwanese application No. 112108751 issued on Sep. 13, 2023.

*Primary Examiner* — Brian P Yenke
(74) *Attorney, Agent, or Firm* — CKC & Partners Co., LLC

(57) ABSTRACT

A real-world view display method applied to a video pass-through system, wherein the video pass-through system includes at least one grayscale camera, a color camera and at least one processor. The real-world view display method includes: by the at least one grayscale camera, capturing at least one grayscale image of a physical environment for generating a grayscale pass-through view corresponding to the physical environment; by the color camera, capturing at least one color image of the physical environment; and by the at least one processor, processing the grayscale pass-through view according to the at least one color image to render a color pass-through view in an immersive content, wherein the color pass-through view is corresponding to the physical environment.

19 Claims, 9 Drawing Sheets

(56) References Cited

U.S. PATENT DOCUMENTS

| | | | |
|---|---|---|---|
| 2017/0278304 A1* | 9/2017 | Hildreth | G06F 3/0484 |
| 2018/0108180 A1* | 4/2018 | Fei | G06F 3/011 |
| 2018/0262693 A1* | 9/2018 | Yuan | H03M 7/3062 |
| 2019/0371072 A1* | 12/2019 | Lindberg | G06T 19/006 |
| 2020/0342673 A1* | 10/2020 | Lohr | G06F 3/013 |
| 2021/0233312 A1* | 7/2021 | Noris | H04N 13/279 |
| 2021/0233313 A1* | 7/2021 | Noris | G06T 19/006 |
| 2022/0051441 A1 | 2/2022 | Zahnert et al. | |
| 2023/0168081 A1* | 6/2023 | Gu | G06T 7/85 |
| | | | 356/603 |
| 2023/0336865 A1* | 10/2023 | Da Veiga | H04N 23/632 |
| 2023/0403386 A1* | 12/2023 | Da Veiga | H04N 13/261 |
| 2024/0037966 A1* | 2/2024 | Lidon | G06V 10/24 |
| 2024/0062425 A1* | 2/2024 | Herold | G06T 7/74 |
| 2024/0062508 A1* | 2/2024 | Litvinov | H04N 5/145 |
| 2024/0119672 A1* | 4/2024 | Chaurasia | G06T 3/18 |

\* cited by examiner

REAL-WORLD VIEW DISPLAY METHOD, VIDEO PASS-THROUGH SYSTEM AND NON-TRANSITORY COMPUTER READABLE STORAGE MEDIUM

CROSS-REFERENCE TO RELATED APPLICATION

This application claims priority to U.S. Provisional Application Ser. No. 63/269,265, filed on Mar. 14, 2022, which is herein incorporated by reference.

BACKGROUND

Field of Invention

This disclosure relates to a method and system, and in particular to a real-world view display method and video pass-through system.

Description of Related Art

In the application of mixed reality (MR), one of the most important things is providing the user in the real world with the simulated real-world view in real time, which can be referred to as video pass-through function. Most related arts use two color cameras to implement the video pass-through function. Some related arts use one color camera to implement the video pass-through function for reducing cost. However, those related arts using one color camera encounter other issues due to the limited field of view of one color camera. Therefore, it is necessary to improve the related arts for implementing the video pass-through function in better way.

SUMMARY

An aspect of present disclosure relates to a real-world view display method applied to a video pass-through system, wherein the video pass-through system includes at least one grayscale camera, a color camera and at least one processor. The real-world view display method includes: by the at least one grayscale camera, capturing at least one grayscale image of a physical environment for generating a grayscale pass-through view corresponding to the physical environment; by the color camera, capturing at least one color image of the physical environment; and by the at least one processor, processing the grayscale pass-through view according to the at least one color image to render a color pass-through view in an immersive content, wherein the color pass-through view is corresponding to the physical environment.

Another aspect of present disclosure relates to a video pass-through system. The video pass-through system includes at least one grayscale camera, a color camera and at least one processor. The at least one grayscale camera is configured to capture at least one grayscale image of a physical environment. The color camera is configured to capture at least one color image of the physical environment. The at least one processor is electrically coupled to the at least one grayscale camera and the color camera and is configured to: generate a grayscale pass-through view corresponding to the physical environment according to the at least one grayscale image; and process the grayscale pass-through view according to the at least one color image to render a color pass-through view in an immersive content, wherein the color pass-through view is corresponding to the physical environment.

Another aspect of present disclosure relates to a non-transitory computer readable storage medium with a computer program to execute a real-world view display method applied to a video pass-through system, wherein the video pass-through system includes at least one grayscale camera, a color camera and at least one processor, and the real-world view display method includes: by the at least one grayscale camera, capturing at least one grayscale image of a physical environment for generating a grayscale pass-through view corresponding to the physical environment; by the color camera, capturing at least one color image of the physical environment; and by the at least one processor, processing the grayscale pass-through view according to the at least one color image to render a color pass-through view in an immersive content, wherein the color pass-through view is corresponding to the physical environment.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed.

Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
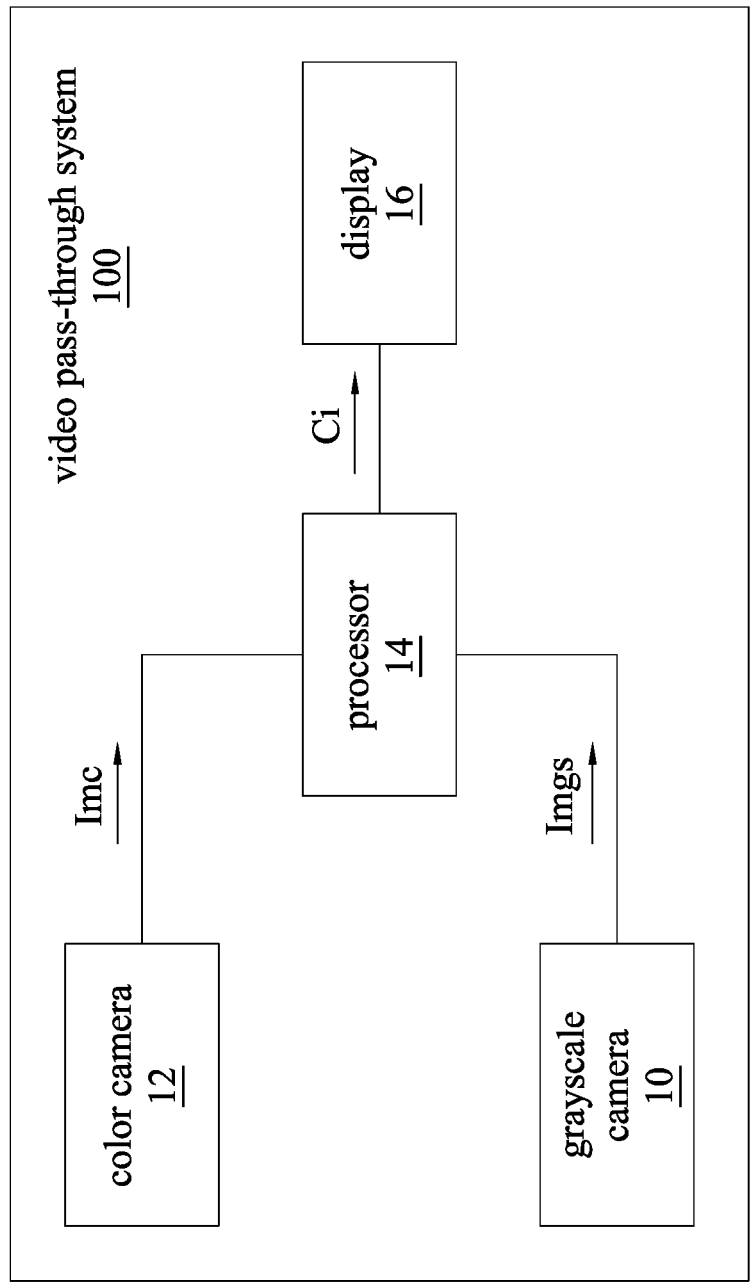
FIG. 1 is a block diagram of a video pass-through system in accordance with some embodiments of the present disclosure.

Referring to FIG. 1, FIG. 1 is a block diagram of a video pass-through system 100 in accordance with some embodiments of the present disclosure. In some embodiments, as shown in FIG. 1, the video pass-through system 100 includes at least one grayscale camera 10, a color camera 12, a processor 14 and a display 16.

In some embodiments, the video pass-through system 100 is operated by a user in a physical environment such as a room, etc. In such conditions, the grayscale camera 10 is configured to capture at least one grayscale image Imgs of the physical environment, and the color camera 12 is configured to capture at least one color image Imc of the physical environment. As shown in FIG. 1, the processor 14 is electrically coupled to the grayscale camera 10 and the color camera 12, so as to receive the at least one grayscale image Imgs and the at least one color image Imc from the grayscale camera 10 and the color camera 12. The processor 14 is configured to generate an immersive content Ci according to the at least one grayscale image Imgs and the at least one color image Imc. Also, the processor 14 is electrically coupled to the display 16, so as to control the display 16 to display the immersive content Ci. As can be seen from that, the video pass-through system 100 can provides the immersive content Ci to the user.

In particular, the immersive content Ci can be a virtual reality (VR) environment, an augmented reality (AR) environment which augments the physical environment directly seen by the user with virtual reality objects (which cannot be directly seen in the physical environment), or a mixed reality (MR) environment which simulates the real-world environment and enables an interaction of the virtual reality objects with the simulated real-world environment.

Figure 2:
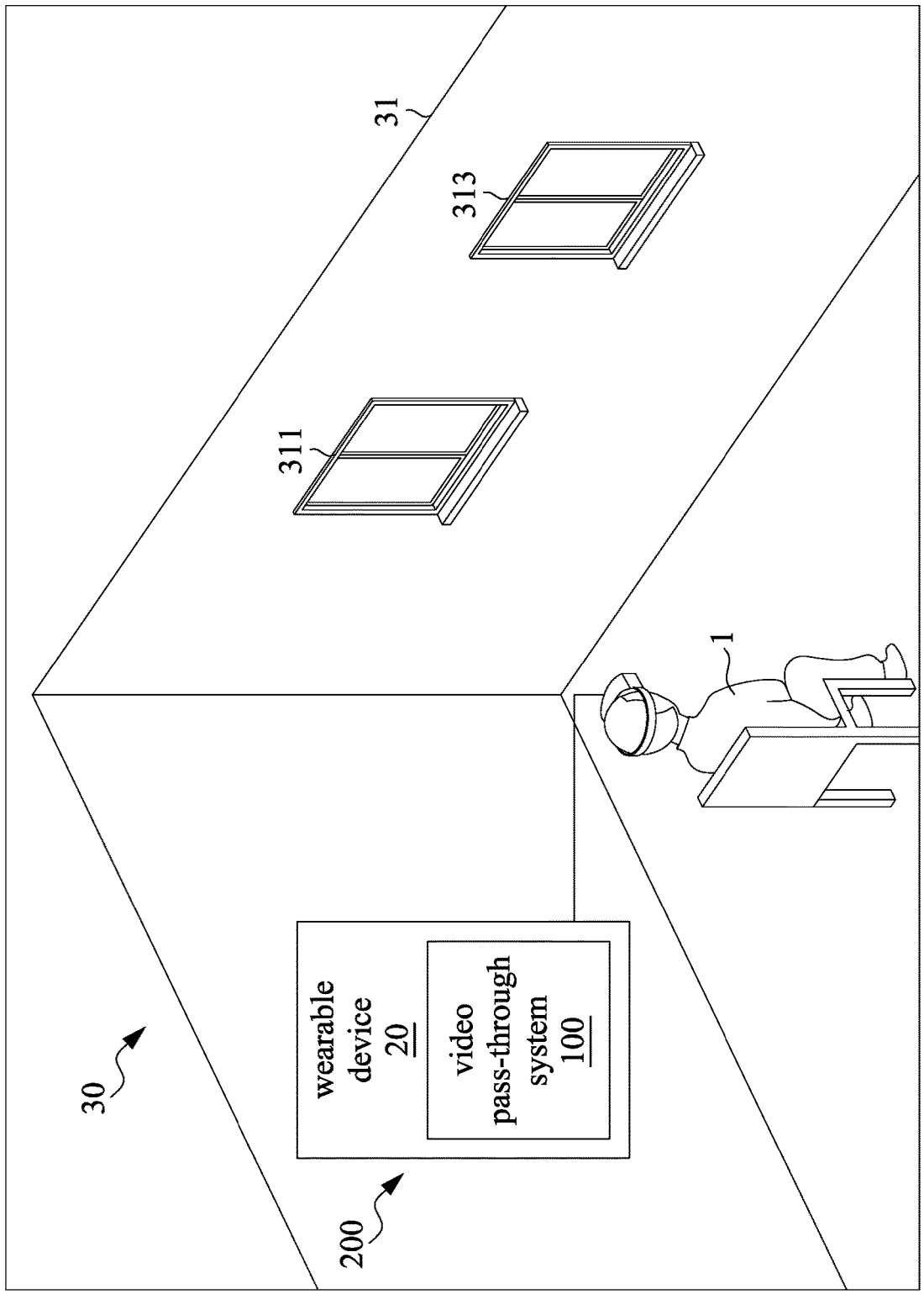
FIG. 2 is a schematic diagram of a multimedia system operated by a user in a physical environment in accordance with some embodiments of the present disclosure.

Referring to FIG. 2, FIG. 2 is a schematic diagram of a multimedia system 200 operated by a user 1 in a physical environment 30 in accordance with some embodiments of the present disclosure. In some embodiments, the multimedia system 200 includes a wearable device 20 and the video pass-through system 100. As shown in FIG. 2, the video pass-through system 100 may be integrated with the wearable device 20. The wearable device 20 can be a head-mounted device (HMD) and is mounted on the head of the user 1. In some embodiments, the wearable device 20 mounted on the head of the user 1 occludes the direct visibility of the user 1 to the physical environment 30. Notably, by integrating the video pass-through system 100 with the wearable device 20, the user 1 wearing the wearable device 20 can still perceive real-world objects existing in the physical environment 30 via the immersive content Ci provided by the video pass-through system 100. For example, the user 1 wearing the wearable device 20 can have information (e.g., position, shape, size, color, texture, etc.) about two windows 311 and 313 on a wall 31 in the physical environment 30 by viewing the immersive content Ci.

Furthermore, in some embodiments, the user 1 wearing the wearable device 20 can also view and experience the virtual reality objects via the immersive content Ci. The user 1 wearing the wearable device 20 can control at least one virtual reality object to interact with the perceived real-world objects by using his/her hand to make movement. However, the present disclosure is not limited herein. In some embodiments, the multimedia system 200 can further include at least one controller (not shown). The controller is electrically or communicatively coupled to the wearable device 20, so that the user 1 wearing the wearable device 20 can control at least one virtual reality object to interact with the perceived real-world objects by using his/her hand to operate the controller.

Figure 3:
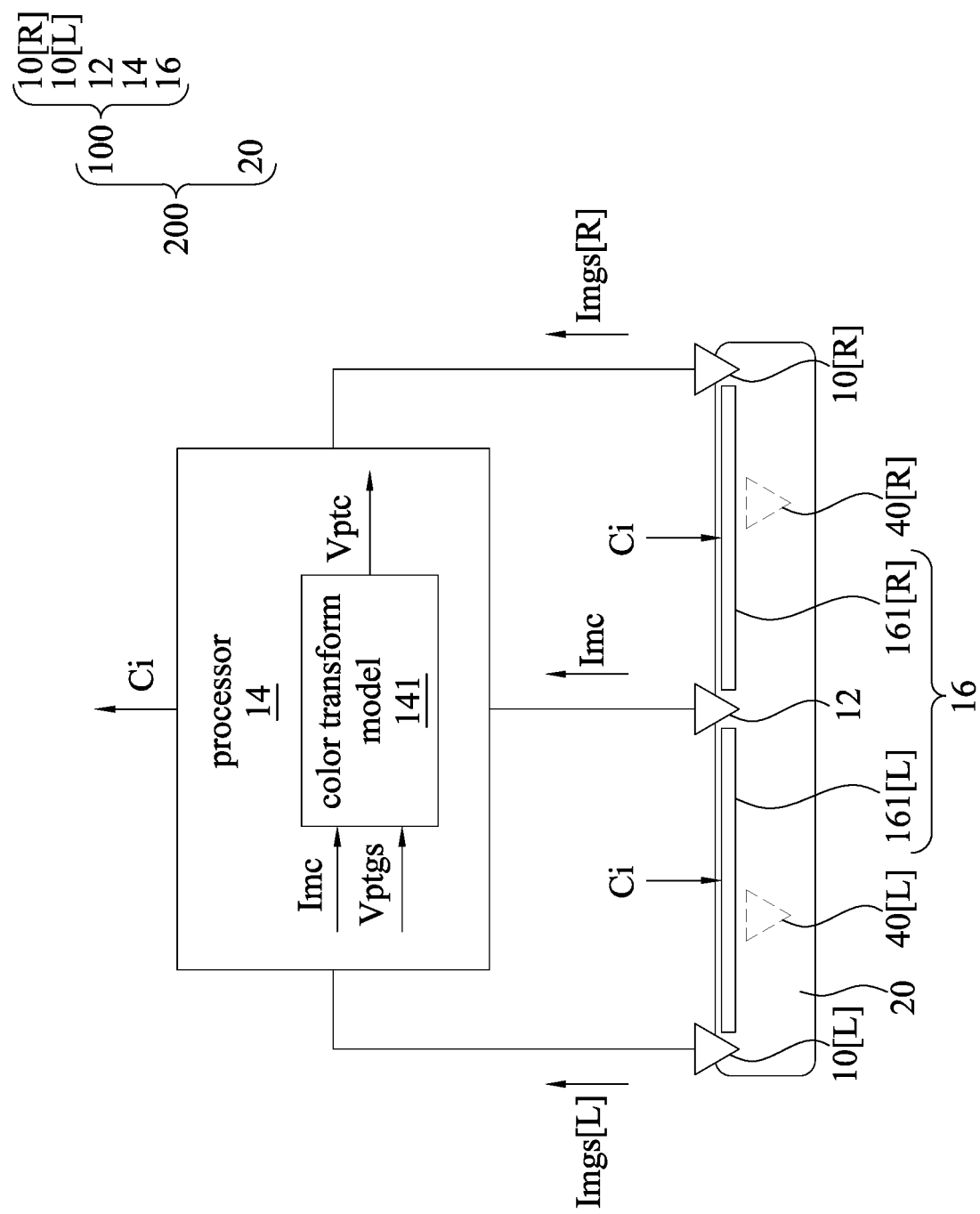
FIG. 3 is a schematic diagram of the integration of the video pass-through system with to a wearable device in accordance with some embodiments of the present disclosure.

The integration of the video pass-through system 100 with the wearable device 20 would be described in detail below with reference to FIG. 3. Referring to FIG. 3, FIG. 3 is a schematic diagram illustrating the integration of the video pass-through system 100 with the wearable device 20 in accordance with some embodiments of the present disclosure. It can be appreciated that the video pass-through system 100 in FIG. 1 is shown and described for illustrative purpose only. The video pass-through system 100 of the present disclosure is not limited to the configuration shown in FIG. 1. For example, in the embodiments of FIG. 3, two grayscale cameras 10[L] and 10[R] are substituted for the grayscale camera 10 in FIG. 1, and the display 16 includes a first display screen 161[L] and a second display screen 161[R].

As shown in FIG. 3, the grayscale cameras 10[L] and 10[R], the color camera 12, the first display screen 161[L] and the second display screen 161[R] are arranged on the wearable device 20. The color camera 12 is located between the grayscale cameras 10[L] and 10[R], between a left eye 40[L] and a right eye 40[R] of the user 1, or between the first display screen 161[L] and the second display screen 161[R]. The grayscale cameras 10[L] and 10[R] are located at a left side of the first display screen 161[L] and a right side of the second display screen 161[R] respectively, or at a left side and a right side of the display 16 respectively. As can be seen from the above descriptions, the first display screen 161[L] is between the grayscale camera 10[L] and the color camera 12, and the second display screen 161[R] is between the color camera 12 and the grayscale camera 10[R]. Also, when the wearable device 20 is mounted on the head of the user 1, the grayscale cameras 10[L] and 10[R] on the wearable device 20 are close to the left eye 40[L] and the right eye 40[R] of the user 1 respectively. In particular, as shown in FIG. 3, the distance between the grayscale cameras 10[L] and 10[R] is bit longer than the distance between the two eyes 40[L] and 40[R]. As can be seen from that, the grayscale cameras 10[L] and 10[R] constitute a grayscale stereo camera.

In some embodiments, the processor 14 can be implemented by one or more central processing unit (CPU), application-specific integrated circuit (ASIC), microprocessor, system on a Chip (SoC) or other suitable processing units. The display 16 can be implemented by an active-matrix organic light-emitting diode (AMOLED) display, or the likes.

In some practical applications, the grayscale cameras 10[L] and 10[R], the color camera 12, the processor 14 and the display 16 are integrated together into the wearable device 20, but the present disclosure is not limited thereto. In some practical applications, as shown in FIG. 3, the processor 14 can be a server independent from the wearable device 20, and the grayscale cameras 10[L] and 10[R], the color camera 12 and the display 16 are integrated together into the wearable device 20. In such arrangements, the processor 14 can transmit the grayscale image Imgs, the color image Imc and the immersive content Ci from/to the wearable device 20 through a communication which may be wired, wireless or a combination of both. In some practical applications, the video pass-through system 100 further includes another processor (not shown) external to the wearable device 20, and said another processor can communicate with the processor 14 integrated into the wearable device 20 to share the computational burden. In other words, the video pass-through system 100 includes at least one processor.

By the arrangements of FIG. 3, at a certain time point, the grayscale camera 10[L] captures a grayscale image Imgs[L] of the physical environment 30 from a left perspective, the color camera 12 captures a color image Imc of the physical environment 30 from a middle perspective, and the grayscale camera 10[R] captures a grayscale image Imgs[R] of the physical environment 30 from a right perspective. In other words, the grayscale cameras 10[L] and 10[R] and the color camera 12 are configured to capture three images of the physical environment 30 from three different perspectives at the certain time point.

Thereafter, as shown in FIG. 3, the grayscale images Imgs[L] and Imgs[R] and the color image Imc are transmitted to the processor 14, so that the processor 14 can provide the immersive content Ci to the display 16. In some embodiments, the processor 14 generates the immersive content Ci via a color transform model 141 loaded therein. The color transform model 141 is a neural network model (e.g., convolutional neural network (CNN) model, multi-layer perceptron (MLP) model, etc.) that has been well-trained to perform image style transfer (or image synthesis) in cooperation with technology related to neural rendering (e.g., rasterization, ray casting, etc.), In such arrangements, the color transform model 141 can generate a color pass-through view Vptc based on the color image Imc and a grayscale pass-through view Vptgs generated according to the grayscale images Imgs[L] and Imgs[R], in which the means for generating the grayscale pass-through view Vptgs would be further described with reference to FIG. 4. The processor 14 then renders the color pass-through view Vptc in the immersive content Ci. The operation of the video pass-through system 100 would be described in detail below with reference to FIG. 4.

Figure 4:
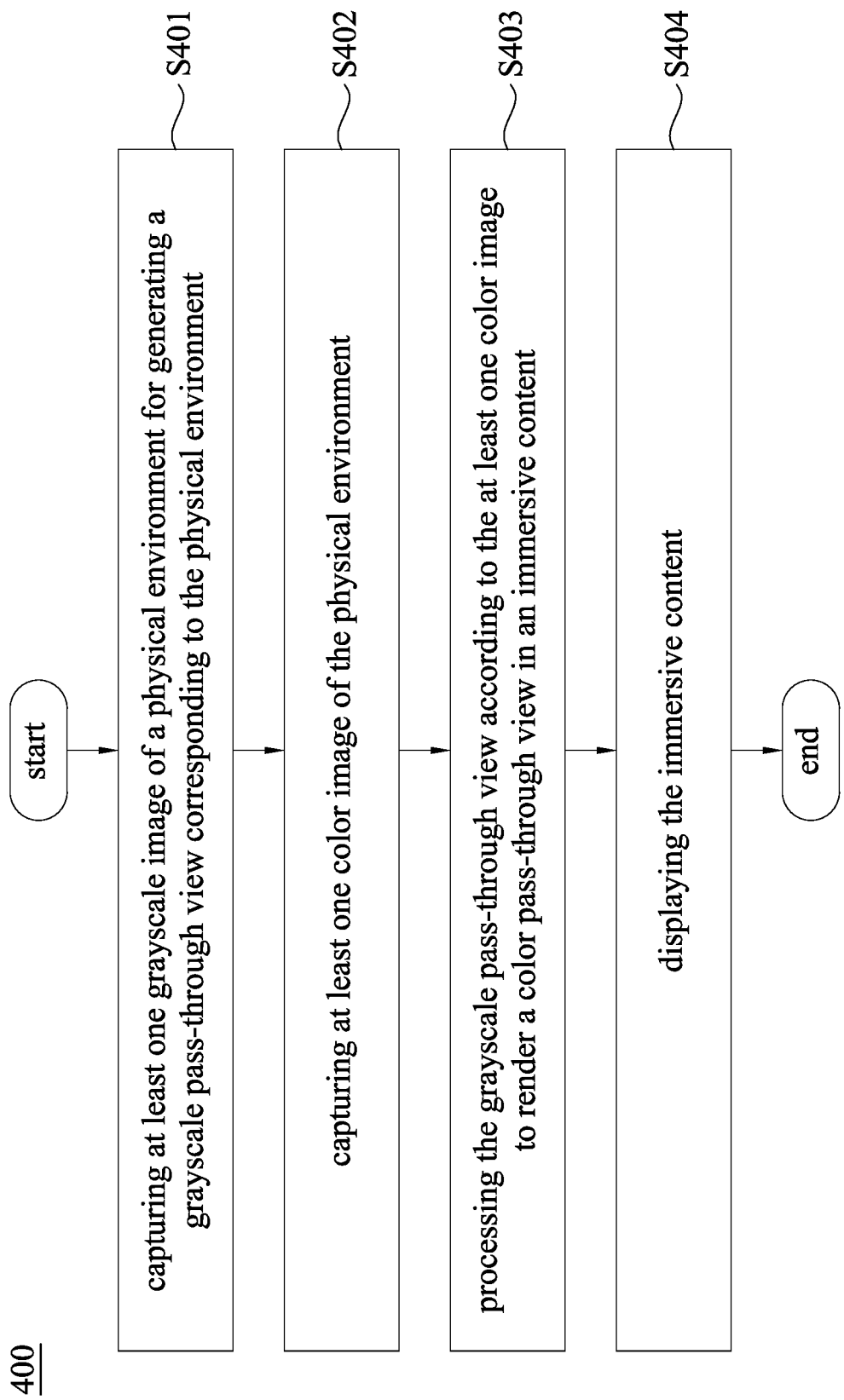
FIG. 4 is a flow diagram of a real-world view display method in accordance with some embodiments of the present disclosure.

Referring to FIG. 4, FIG. 4 is a flow diagram of a real-world view display method 400 in accordance with some embodiments of the present disclosure. The real-world view display method 400 can be performed by the video pass-through system 100 of FIG. 1 or 3, but the present disclosure should not be limited herein. In some embodiments, as shown in FIG. 4, the real-world view display method 400 includes operations S401-S404. For the sake of clarity and convenience, operations S401-S404 would be described with reference to at least FIGS. 2 and 3.

In operation S401, at least one grayscale image of a physical environment is captured for generating a grayscale pass-through view corresponding to the physical environment. In some embodiments, as shown in FIGS. 2 and 3, the grayscale cameras 10[L] and 10[R] capture the grayscale images Imgs[L] and Imgs[R] of the physical environment 30 from different perspectives. The processor 14 then performs stereo matching or disparity estimation on the grayscale images Imgs[L] and Imgs[R] captured from different perspectives to generate the grayscale pass-through view Vptgs corresponding to the physical environment 30. The stereo matching or disparity estimation would not be described in detail because it is well known to the person skilled in the art of the present disclosure.

Figure 5:
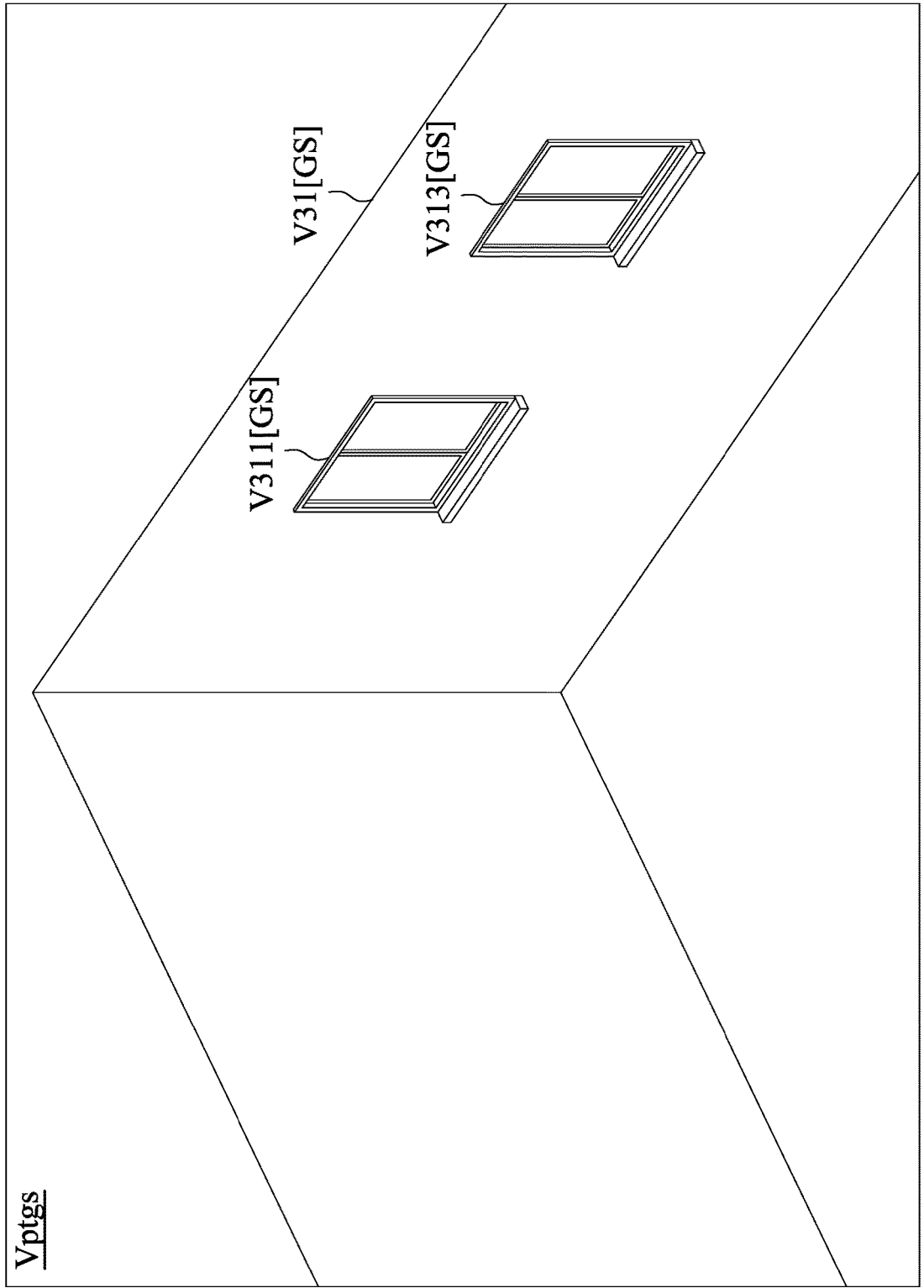
FIG. 5 is a schematic diagram of a grayscale pass-through view in accordance with some embodiments of the present disclosure.

In some embodiments, the grayscale pass-through view Vptgs may include depth information related to positions, geometries and/or shapes of the real-word objects existing in the physical environment 30. For example, referring to FIG. 5, FIG. 5 is a schematic diagram of the grayscale pass-through view Vptgs in accordance with some embodiments of the present disclosure. In FIG. 5, the grayscale pass-through view Vptgs presents a grayscale stereo image of the physical environment 30 as shown in FIG. 2 which includes two grayscale stereo windows V311[GS] and V313[GS] on a grayscale stereo wall V31[GS]. As can be seen from FIGS. 2 and 5, the arrangement of the grayscale stereo windows V311[GS] and V313[GS] on the grayscale stereo wall V31 [GS] are similar to that of the windows 311 and 313 on the wall 31.

Figure 6:
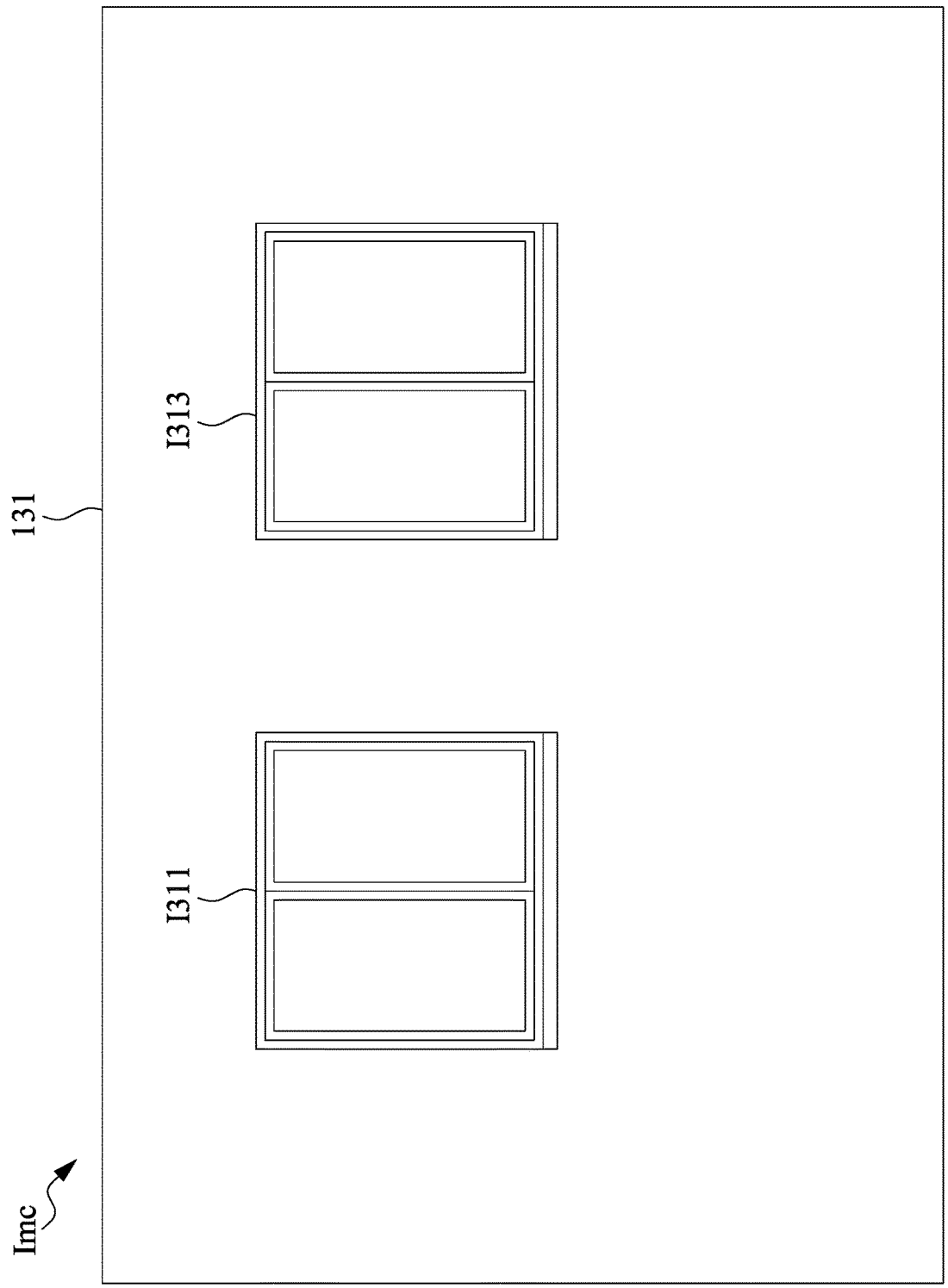
FIG. 6 is a schematic diagram of a color image in accordance with some embodiments of the present disclosure.

In operation S402, at least one color image of the physical environment is captured. In some embodiments, as shown in FIGS. 2 and 3, the color camera 12 captures the color image Imc of the physical environment 30. The color image Imc may include color information related to colors of the real-word objects existing in the physical environment 30. For example, referring to FIG. 6, FIG. 6 is a schematic diagram of the color image Imc in accordance with some embodiments of the present disclosure. In FIG. 6, the color image Imc presents two two-dimensional (2D) window images 1311 and 1313 on a 2D wall image 131, which is corresponding to the physical environment 30 as shown in FIG. 2. It can be appreciated that the 2D window images 1311 and 1313 would have the same colors as those of the windows 311 and 313, and the 2D wall image 131 would have the same color as that of the wall 31.

In operation S403, the grayscale pass-through view is processed according to the at least one color image to render a color pass-through view in an immersive content. In some embodiments, as shown in FIG. 3, the processor 14 utilizes the trained color transform model 141 to transfer the color information in the color image Imc to the grayscale pass-through view Vptgs, so as to generate the color pass-through view Vptc. In particular, by utilizing geometric information in the grayscale pass-through view Vptgs in cooperation with the color information in the color image Imc and the direction corresponding to the color image Imc, the color transform model 141 can correctly color the grayscale pass-through view Vptgs, so as to generate the color pass-through view Vptc having the geometric and color information that would be considered to be true by the user 1. However, the present disclosure is not limited thereto. In some embodiments, based on a known relative location relationship between the color camera 12 and the two grayscale cameras 10[L] and 10[R], the processor 14 utilizes at least one algorithm to project and map the color information in the color image Imc to the grayscale stereo image presented by the grayscale pass-through view Vptgs, so as to generate the color pass-through view Vptc. For example, referring to FIGS. 5 and 6 together, the processor 14 may apply the color of the 2D window image 1311 to the surface of the grayscale stereo windows V311[GS], may apply the color of the 2D window image 1313 to the surface of the grayscale stereo windows V313[GS] and may apply the color of the 2D wall image 131 to the surface of the grayscale stereo wall V31[GS].

Furthermore, in some embodiments, the color image Imc is higher than the grayscale images Imgs[L] and Imgs[R] in resolution. Therefore, a resolution of the color pass-through view Vptc generated by the color transform model 141 according to the color image Imc and the grayscale pass-through view Vptgs would be naturally higher than a resolution of the grayscale pass-through view Vptgs, but would not exceed a resolution of the color image Imc. In other words, the processor 14 further increases the resolution of the grayscale pass-through view Vptgs according to resolution information of the color image Imc by itself (or by utilizing the color transform model 141), so that the color pass-through view Vptc is higher than the grayscale pass-through view Vptgs in resolution. The resolution of the color image Imc can be adjusted for meeting the requirements of system performance. It can be appreciated that the increase of resolution can also be implemented by an interpolation algorithm, but the present disclosure is not limited herein.

Figure 7:
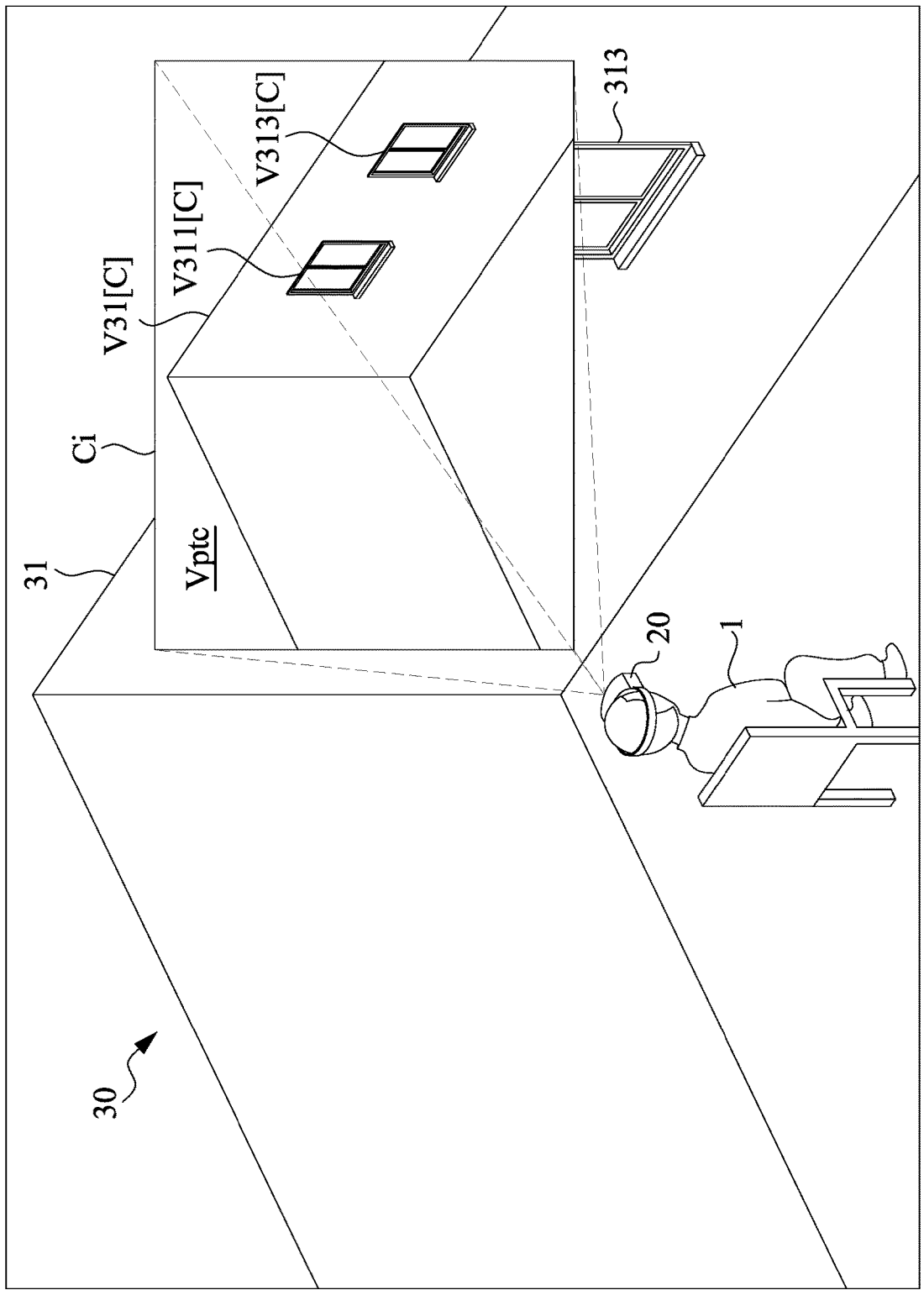
FIG. 7 is a schematic diagram of an immersive content viewed by the user in the physical environment in accordance with some embodiments of the present disclosure.

After the color pass-through view Vptc is generated, the processor 14 renders the color pass-through view Vptc in the immersive content Ci, so that operation S404 is performed. In operation S404, the immersive content Ci is displayed. In some embodiments, as shown in FIG. 3, the display 16 receives the immersive content Ci from the processor 14 and then displays the immersive content Ci. Referring to FIG. 7, FIG. 7 is a schematic diagram of the immersive content Ci viewed by the user 1 in the physical environment 30 in accordance with some embodiments of the present disclosure. In FIG. 7, the color pass-through view Vptc is rendered in the immersive content Ci and presents a color stereo image of the physical environment 30 which includes two color stereo windows V311[C] and V313[C] on a color stereo wall V31[C]. As can be appreciated, the color of the color stereo window V311[C] is substantially same as the color of the window 311 in FIG. 2, the color of the color stereo window V313[C] is substantially same as the color of the window 313 in FIG. 2, and the color of the color stereo wall V31[C] is substantially same as the color of the wall 31 in FIG. 2. Notably, although the direct visibility of the user 1 to the physical environment 30 is occluded by the wearable device 20, the user 1 can still perceive the physical environment 30 via the color pass-through view Vptc in the immersive content Ci displayed by the display 16 of arranged on the wearable device 20.

In the above embodiments, the color transform model 141 may be trained with a training data which includes multiple pairs of a 2D color image and a grayscale stereo image. Each pair of the 2D color image and the grayscale stereo image can be associated with a ground truth color stereo image having ground truth color information and ground truth depth information. By inputting the training data to the color transform model 141, the color transform model 141 can generate multiple predicted color stereo images and can be modified according to a difference between the predicted color stereo image and the ground truth color stereo image. In such way, the color transform model 141 can learn to transfer the color information in the 2D color image to the grayscale stereo image, so as to generate the predicted color stereo image substantially same as the ground truth color stereo image. Furthermore, the training of the color transform model 141 may be completed before the official use of the color transform model 141, but the present disclosure is not limited herein. The training of the color transform model 141 may be proceeded in real-time for optimization when the color transform model 141 is currently used.

Figure 8:
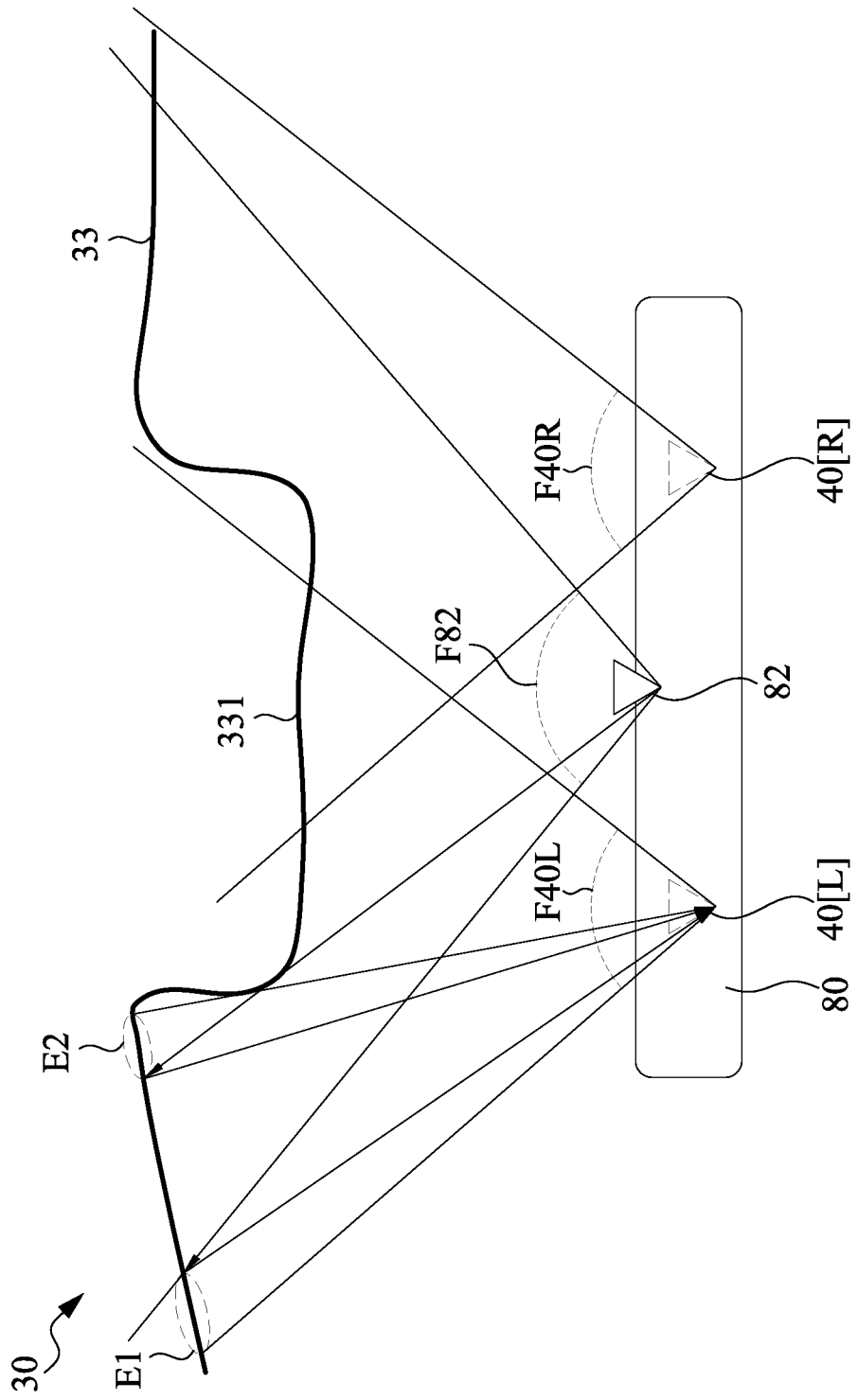
FIG. 8 is a schematic diagram of a field of view of a color camera in accordance with some related arts.

Referring to FIG. 8, FIG. 8 is a schematic diagram of a field of view F82 of a color camera 82 of a wearable device 80 in accordance with some related arts. Some related arts uses one color camera 82 as a base for generating the color pass-through view, so as to reduce cost. However, other issues may be introduced. For example, as shown in FIG. 8, the field of view F82 of the color camera 82 is narrower than a field of view of the user (i.e., a combination of two field of views F40L and F40R of the two eyes 40[L] and 40[R]). In this regard, a portion E1 of another wall 33 in the physical environment 30 is out of the field of view F82 of the color camera 82, and therefore the color pass-through view provided by the wearable device 80 is narrower than the field of view of the user when not wearing the wearable device 80. In addition, as shown in FIG. 8, another portion E2 of the wall 33 in the physical environment 30 may be occluded by a column 311 on the wall 33 and may disappear in the field of view F82 of the color camera 82 (that is, the portion E2 is a blind spot of the color camera 82). Therefore, the portion E2 that originally can be seen by the user when not wearing the wearable device 80 will be rendered as a black portion (or a blank portion) in the color pass-through view provided by the wearable device 80, which results in an imperfect real-world view.

Figure 9:
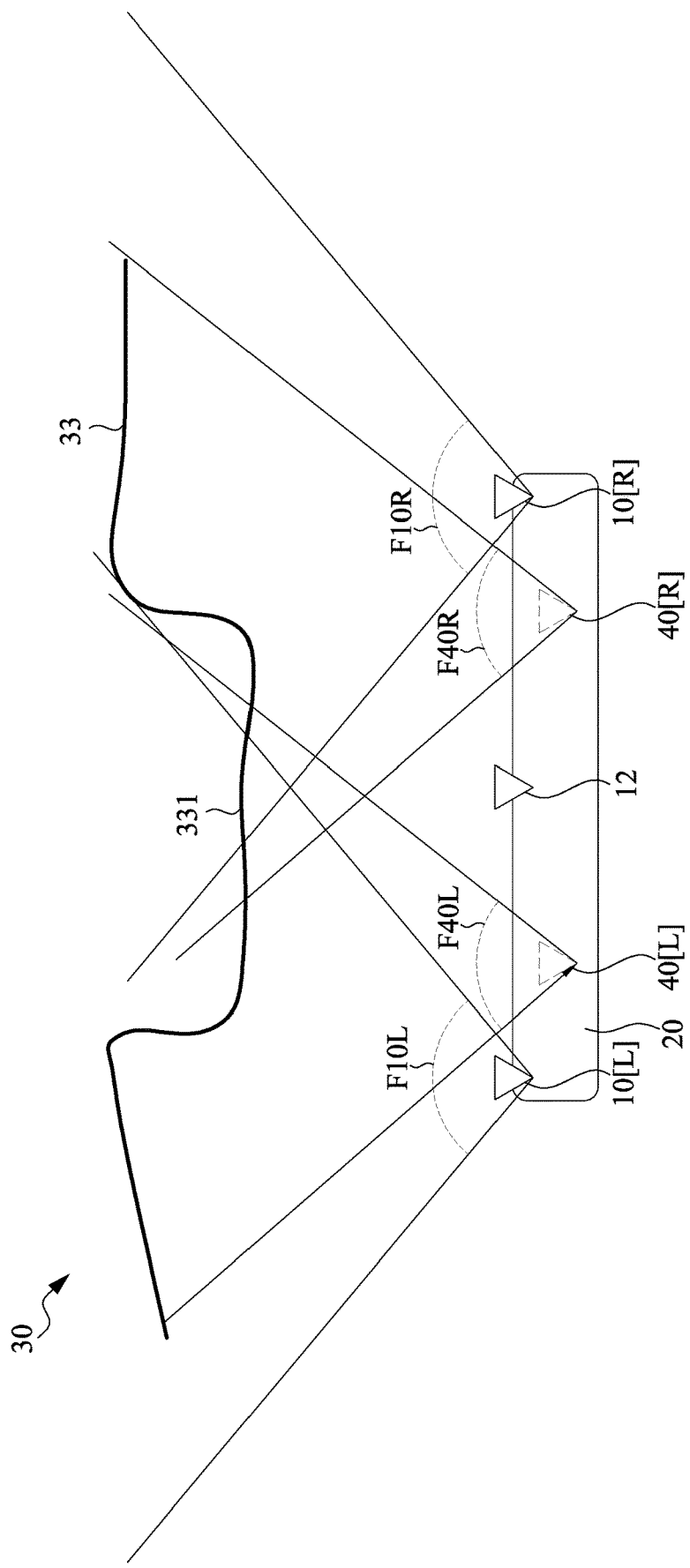
FIG. 9 is a schematic diagram of a field of view of at least one grayscale camera in accordance with some embodiments of the present disclosure.

Referring to FIG. 9, FIG. 9 is a schematic diagram of two field of views F10L and F10R of the grayscale cameras 10[L] and 10[R] in accordance with some embodiments of the present disclosure. In the embodiments of FIG. 9, the two grayscale cameras 10[L] and 10[R] are used to generate the grayscale pass-through view Vptgs as a base for generating the color pass-through view Vptc, which can refer to the above descriptions. As shown in FIG. 9, a combination of the two field of views F10L and F10R of the grayscale cameras 10[L] and 10[R] is broader than the combination of the two field of views F40L and F40R of the two eyes 40[L] and 40[R]. Also, the grayscale cameras 10[L] and 10[R] can cover the blind spot for each other. In this regard, the above issues introduced by using one color camera to generate the color pass-through view would not be raised.

In the above embodiments, referring to FIGS. 2 and 3 again, the processor 14 is further configured to locate the wearable device 20 in the physical environment 30 according to the grayscale images Imgs[L] and Imgs[R] captured by the grayscale cameras 10[L] and 10[R]. The operation of locating the wearable device 20 can be implemented by Simultaneous Localization and Mapping (SLAM) technology, but the present disclosure is not limited herein. As can be seen from that, the grayscale cameras 10[L] and 10[R] of the video pass-through system 100 can be used to locate the wearable device 20 as well as be used as a base for generating the color pass-through view Vptc of the physical environment 30. In this regard, only one color camera 12 is needed by the video pass-through system 100, and the cost thereof can be reduced.

As can be seen from the above embodiments of the present disclosure, by transferring the color information to the grayscale pass-through view for generating the color pass-through view, the video pass-through system 100 and the real-world view display method 400 of the present disclosure would not raise multiple issues such as, the narrow real-world view due to insufficient field of view of one color camera, the imperfect real-world view due to occlusion in the physical environment, etc. In addition, the cost of the video pass-through system 100 is low in comparison to the related arts using dual color camera as a base for generating real-world view.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A real-world view display method applied to a video pass-through system, wherein the video pass-through system comprises two grayscale cameras, a color camera and at least one processor, and the real-world view display method comprises:
   by the two grayscale cameras, capturing at least one grayscale image of a physical environment for generating a grayscale pass-through view corresponding to the physical environment;
   by the color camera, capturing at least one color image of a part of the physical environment, wherein a field of view of the color camera is smaller than a field of view of the two grayscale cameras; and
   by the at least one processor, generating at least one color information corresponding to the part of the physical environment according to the at least one color image, transforming the grayscale pass-through view into a color pass-through view corresponding to the physical environment according to the at least one color information, and rendering the color pass-through view in an immersive content.

2. The real-world view display method of claim 1, wherein the operation of transforming the grayscale pass-through view into the color pass-through view corresponding to the physical environment according to the at least one color information, and rendering the color pass-through view in the immersive content comprises:
   projecting and mapping the at least one color information in the at least one color image to the grayscale pass-through view.

3. The real-world view display method of claim 1, wherein the operation of transforming the grayscale pass-through view into the color pass-through view corresponding to the physical environment according to the at least one color information, and rendering the color pass-through view in the immersive content comprises:
   increasing a resolution of the grayscale pass-through view according to a resolution information of the at least one color image, so that the color pass-through view is higher than the grayscale pass-through view in resolution.

4. The real-world view display method of claim 1, wherein the operation of transforming the grayscale pass-through view into the color pass-through view corresponding to the physical environment according to the at least one color information, and rendering the color pass-through view in the immersive content comprises:
   utilizing a color transform model to transfer the at least one color information in the at least one color image to the grayscale pass-through view.

5. The real-world view display method of claim 1, wherein the video pass-through system further comprises a display, and the real-world view display method further comprises:
   by the display, displaying the immersive content.

6. A video pass-through system, comprising:
   two grayscale cameras configured to capture at least one grayscale image of a physical environment;
   a color camera configured to capture at least one color image of a part of the physical environment, wherein a field of view of the color camera is smaller than a field of view of the two grayscale cameras; and
   at least one processor electrically coupled to the two grayscale cameras and the color camera and configured to:
   generate a grayscale pass-through view corresponding to the physical environment according to the at least one grayscale image; and
   generate at least one color information corresponding to the part of the physical environment according to the at least one color image, transform the grayscale pass-through view into a color pass-through view corresponding to the physical environment according to the at least one color information, and render the color pass-through view in an immersive content.

7. The video pass-through system of claim 6, wherein the two grayscale cameras comprise a first grayscale camera and a second grayscale camera, and the first grayscale camera, the second grayscale camera and the color camera are arranged on a wearable device.

8. The video pass-through system of claim 7, wherein the color camera is located between the first grayscale camera and the second grayscale camera.

9. The video pass-through system of claim 7, wherein the video pass-through system further comprises a display, and the display is coupled to the at least one processor and is configured to display the immersive content,
   wherein the display is arranged on the wearable device, and the first grayscale camera and the second grayscale camera are located at a left side and a right side of the display respectively.

10. The video pass-through system of claim 7, wherein the at least one processor is configured to locate the wearable device according to the at least one grayscale image captured by the two grayscale cameras.

11. The video pass-through system of claim 6, wherein the at least one color image is higher than the at least one grayscale image in resolution.

12. The video pass-through system of claim 6, wherein the at least one processor is configured to project and map the at least one color information in the at least one color image to the grayscale pass-through view.

13. The video pass-through system of claim 6, wherein the at least one processor is configured to increase a resolution of the grayscale pass-through view according to a resolution information of the at least one color image, so that the color pass-through view is higher than the grayscale pass-through view in resolution.

14. The video pass-through system of claim 6, wherein the at least one processor is configured to utilize a color transform model to transfer the at least one color information in the at least one color image to the grayscale pass-through view.

15. A non-transitory computer readable storage medium with a computer program to execute a real-world view display method applied to a video pass-through system, wherein the video pass-through system comprises two grayscale cameras, a color camera and at least one processor, and the real-world view display method comprises:
- by the two grayscale cameras, capturing at least one grayscale image of a physical environment for generating a grayscale pass-through view corresponding to the physical environment;
- by the color camera, capturing at least one color image of a part of the physical environment, wherein a field of view of the color camera is smaller than a field of view of the two grayscale cameras; and
- by the at least one processor, generating at least one color information corresponding to the part of the physical environment according to the at least one color image, transforming the grayscale pass-through view into a color pass-through view corresponding to the physical environment according to the at least one color information, and rendering the color pass-through view in an immersive content.

16. The non-transitory computer readable storage medium of claim 15, wherein the operation of transforming the grayscale pass-through view into the color pass-through view corresponding to the physical environment according to the at least one color information, and rendering the color pass-through view in the immersive content comprises:
- projecting and mapping the at least one color information in the at least one color image to the grayscale pass-through view.

17. The non-transitory computer readable storage medium of claim 15, wherein the operation of transforming the grayscale pass-through view into the color pass-through view corresponding to the physical environment according to the at least one color information, and rendering the color pass-through view in the immersive content comprises:
- increasing a resolution of the grayscale pass-through view according to a resolution information of the at least one color image, so that the color pass-through view is higher than the grayscale pass-through view in resolution.

18. The non-transitory computer readable storage medium of claim 15, wherein the operation of transforming the grayscale pass-through view into the color pass-through view corresponding to the physical environment according to the at least one color information, and rendering the color pass-through view in the immersive content comprises:
- utilizing a color transform model to transfer the at least one color information in the at least one color image to the grayscale pass-through view.

19. The non-transitory computer readable storage medium of claim 15, wherein the video pass-through system further comprises a display, and the real-world view display method further comprises:
- by the display, displaying the immersive content.

* * * * *